(12) United States Patent
Husberg

(10) Patent No.: US 12,534,062 B2
(45) Date of Patent: Jan. 27, 2026

(54) METHOD FOR CONTROLLING A VEHICLE DRIVELINE COMPRISING A FIRST DRIVING MODE AND A SECOND DRIVING MODE

(71) Applicant: VOLVO TRUCK CORPORATION, Gothenburg (SE)

(72) Inventor: Tobias Husberg, Kareby (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 199 days.

(21) Appl. No.: 18/487,462

(22) Filed: Oct. 16, 2023

(65) Prior Publication Data

US 2024/0149862 A1    May 9, 2024

(30) Foreign Application Priority Data

Nov. 4, 2022  (EP) .................................... 22205661

(51) Int. Cl.
*B60W 20/12*  (2016.01)
*B60W 10/06*  (2006.01)
(Continued)

(52) U.S. Cl.
CPC ............ *B60W 20/12* (2016.01); *B60W 10/06* (2013.01); *B60W 10/08* (2013.01); *B60W 50/082* (2013.01); *B60W 2556/45* (2020.02)

(58) Field of Classification Search
CPC .................................................... B60W 20/12
See application file for complete search history.

(56) References Cited

U.S. PATENT DOCUMENTS 10,678,234 B2 *  6/2020  Sun ...................... G05D 1/0005
11,619,944 B2 *  4/2023  Grossman ......... B60W 60/0023
                                                    701/23

(Continued)

FOREIGN PATENT DOCUMENTS

EP    1515122 A1    3/2005
EP    2933157 A1    10/2015
(Continued)

OTHER PUBLICATIONS

Extended European Search Report in corresponding European Application No. 22205661.6 dated Mar. 31, 2023 (8 pages).

*Primary Examiner* — Michael A Berns
(74) *Attorney, Agent, or Firm* — Jeffri A. Kaminski; Venable LLP

(57) ABSTRACT

A computer-implemented method is provided for controlling a vehicle driveline comprising a propulsion unit and a transmission. The method uses topographic data in order to provide predictive control of the vehicle driveline, where the driveline comprises a first driving mode and a second driving mode, where the vehicle is driving to a predetermined destination. The method includes receiving topographic data for the route to the predetermined destination, determining a number of predictive parameters for the route, where, in the first driving mode, the vehicle driveline is controlled in an eco-mode in order to provide the lowest possible energy consumption to the predetermined destination, and where, in the second driving mode, the vehicle driveline is controlled in order for the vehicle to arrive at the predetermined destination at a predetermined time.

8 Claims, 2 Drawing Sheets

(51) Int. Cl.
*B60W 10/08* (2006.01)
*B60W 50/08* (2020.01)

(56) References Cited

U.S. PATENT DOCUMENTS

| | | |
|---|---|---|
| 12,233,876 B2 * | 2/2025 | Weston ................. B60Q 1/143 |
| 2022/0171398 A1 | 6/2022 | Grossman et al. |
| 2024/0149862 A1 * | 5/2024 | Husberg ................ B60W 20/12 |

FOREIGN PATENT DOCUMENTS

| | | |
|---|---|---|
| EP | 4027113 A1 | 7/2022 |
| JP | H1139592 A | 2/1999 |
| WO | 2013165298 A1 | 11/2013 |
| WO | 2019117787 A1 | 6/2019 |

\* cited by examiner

METHOD FOR CONTROLLING A VEHICLE DRIVELINE COMPRISING A FIRST DRIVING MODE AND A SECOND DRIVING MODE

TECHNICAL FIELD

The present disclosure relates to a computer-implemented method for controlling a vehicle driveline provided with a first driving mode and a second driving mode. The present disclosure also relates to a computer program, to a computer readable medium and to a control unit for performing the method. The present disclosure further relates to a vehicle comprising such a control unit.

The general inventive concept can be applied in heavy-duty vehicles adapted to travel on a road, such as trucks and buses. Although the invention will be described with respect to a heavy-duty vehicle, the general inventive concept is not restricted to this particular vehicle, but may also be used in other vehicles such as cars.

BACKGROUND ART

There is an ongoing effort in the heavy-duty vehicle industry towards improving the fuel economy of the vehicles and to provide vehicles that are more environmentally friendly. These aspects are oftentimes also considered by the drivers, in particular professional drivers of heavy-duty vehicle. Some drivers may have a driving style that results in lower fuel consumption than other driving styles. For examples, it has been common practice among drivers of heavy-duty vehicles to shut off the internal combustion engine when the vehicle is travelling along a downwardly sloping road segment in order to rely on freewheeling of the vehicle, thereby reducing the fuel consumption and environmental impact.

The vehicle industry has also been considering control strategies in which the energy consumption of the vehicle is optimized for the planned route.

For a vehicle having an internal combustion engine, the speed of the vehicle is controlled in order to minimize fuel consumption over the planned route. For a vehicle having an electrical driveline, the speed of the vehicle may be controlled in order to minimize the electric energy consumption.

Such control modes may be desirable, but there is still room for improvements.

DISCLOSURE OF INVENTION

An object of the invention is therefore to provide an improved control method for a vehicle driveline. A further object of the invention is to provide a control unit for controlling a vehicle driveline. A further object of the invention is to provide a vehicle comprising such a control unit. An object is also to provide a computer program and a computer program product adapted to perform the steps of the method.

The solution to the problem according to the invention is defined by the claims directed to a method, a control unit and a vehicle. The claims also contain advantageous further developments of the inventive method.

In the inventive method for controlling a vehicle driveline comprising a propulsion unit and a transmission, where the method uses topographic data in order to provide predictive control of the vehicle driveline, where the driveline comprises a first driving mode and a second driving mode, where the vehicle is driving to a predetermined destination, the steps of: receiving topographic data for the route to the predetermined destination, determining a number of predictive parameters for the route, where, in the first driving mode, the vehicle driveline is controlled in an eco-mode in order to provide the lowest possible energy consumption to the predetermined destination, and where, in the second driving mode, the vehicle driveline is controlled in order for the vehicle to arrive at the predetermined destination at a predetermined time are disclosed.

The advantage of the method is that in some cases, the predetermined destination must not be reach at an exact time. In this case, it is of advantage to minimize energy consumption of the vehicle in order to save fuel and thus cost. In other cases, there is a deadline that has to be held, i.e. the vehicle must be at the predetermined destination at a predetermined time.

With the inventive method, the driveline of a vehicle can in a first driving mode be controlled to provide the lowest possible energy consumption needed to reach the predetermined destination. In a second driving mode, the driveline of the vehicle can be controlled to reach the predetermined destination at a predetermined time or in a predetermined time interval. In this driving mode, the timeliness is more important than energy consumption, and the used energy or the total cost may thus be higher when the vehicle driveline is controlled in the second driving mode. The reason for prioritizing arrival time and not fuel consumption may e.g. be that the delivery of components are used in a just-in-time scheme, where a delayed delivery is charged with a delay fee. Another reason may e.g. be for a truck or a bus that must meet a ferry departure time. A further reason may e.g. be for a truck driver to reach a parking space for a mandatory pause while maximizing the usable driving time.

The second driving mode may be selected automatically by the control system of the vehicle, or may be selected manually by the driver. The selection of the second driving mode is primarily based on arrival time, but may also be based on cost. It is thus possible to select or not select the second driving mode depending on estimated cost for the arrival time, i.e. if it pays off to use the second driving mode.

In one example, toll road cost is used as a parameter. The cost for using a toll road, which probably is faster, is compared to the time difference when a free road is used. Depending on the estimated arrival time to the predetermined destination, it may be decided to use the toll road for a smaller or larger part of the travelled route, or to use the first driving mode for the travelled route.

The advantage of the method is that in some cases, the predetermined destination must not be reach at an exact time. In this case, it is of advantage to minimize energy consumption of the vehicle in order to save fuel and thus cost. In other cases, there is a deadline that has to be met, i.e. the vehicle must be at the predetermined destination at a predetermined time.

The topographic data may suitably be obtained by a GPS system or a similar positioning system of the vehicle, where the GPS system provides the position data that is linked to a map in a database. The acquired topographic data will comprise data for the complete route to the predetermined destination. The topographic data is suitably acquired by an ECU (Electronic Control Unit) that is connected to the positioning system of the vehicle. Thus, the electronic control unit may acquire the topographic data by means of the positioning system.

As will be readily understood, the acquired topographic data may have varying topography. For instance, one or more parts of the route may be uphill, one or more parts may be downhill, and one or more parts may be substantially flat. Such different topographies may call for different driving scenarios. For example, in case of an uphill part of the road, it may be predicted that a certain power/torque may be required to effectively operate the ICE (Internal Combustion Engine). On the other hand, in case of a downhill part of the road, it may be predicted that engine braking or brake regeneration should be activated.

A number of predictive parameters of the route are determined based on the topographic data. This may e.g. include a predicted loss of speed due to a hill climb. In case the vehicle is gaining speed when riding downhill and it is predicted that the vehicle speed will exceed the upper limit of the desired speed range unless the brakes are applied or engine braking is performed, a downshift for engine braking may be required. In order to achieve a good drivability, the engaging gear may be selected accordingly. Nevertheless, the gear may be quickly shifted from the initially selected gear for further controlling the vehicle, e.g. a quick downshift for engine braking. In this connection it should be noted that drivability is not only limited to the perceived feeling for the driver, but may also include adaptation to the traffic flow and achieving good productivity.

In one example, it may be predicted that the vehicle speed in the near future will fall below the lower limit of the desired speed range or exceed the upper limit of the desired speed range, and that in anticipation of such an undesired event, the ICE is appropriately controlled to adapt to the predicted undesired event. It may also be predicted that the vehicle will need an acceleration or that propulsion torque/power needs to be applied. In this case, it is desirable if as much as possible of the available kinetic energy can be maintained. For instance, if the vehicle is approaching a steep hill, it may be desirable to accelerate the vehicle before the climb.

According to a second aspect of the present invention, there is provided a computer program comprising program code means for performing the steps of the method, including any embodiment thereof. The advantages of the computer program are largely analogous to the advantages of the method, including any embodiment thereof.

According to a third aspect of the present invention, there is provided a computer readable medium carrying a computer program comprising program code means for performing the steps of the method, including any embodiment thereof, when said program product is run on a computer. The advantages of the computer readable medium are largely analogous to the advantages of the method, including any embodiment thereof.

According to a fourth aspect of the present invention, there is provided a control unit for controlling the driveline of a vehicle, the control unit being configured to perform the steps of the method, including any embodiment thereof. The advantages of the control unit are largely analogous to the advantages of the method, including any embodiment thereof.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where it includes a programmable device such as the microprocessor, microcontroller or programmable digital signal processor mentioned above, the processor may further include computer executable code that controls operation of the programmable device.

According to a fifth aspect of the present invention, there is provided a vehicle comprising a control unit according to the fourth aspect, including any embodiment thereof. The advantages of the vehicle of the fifth aspect are largely analogous to the advantages of the control unit of the fourth aspect, including any embodiment thereof.

Generally, all terms used in the claims are to be interpreted according to their ordinary meaning in the technical field, unless explicitly defined otherwise herein. All references to "a/an/the part, element, apparatus, component, arrangement, device, means, step, etc." are to be interpreted openly as referring to at least one instance of the part, element, apparatus, component, arrangement, device, means, step, etc., unless explicitly stated otherwise. The steps of any method disclosed herein do not have to be performed in the exact order disclosed, unless explicitly stated. Further features of, and advantages with, the present inventive concept will become apparent when studying the appended claims and the following description. The skilled person realizes that different features of the present inventive concept may be combined to create embodiments other than those described in the following, without departing from the scope of the present inventive concept.

BRIEF DESCRIPTION OF DRAWINGS

The invention will be described in greater detail in the following, with reference to the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
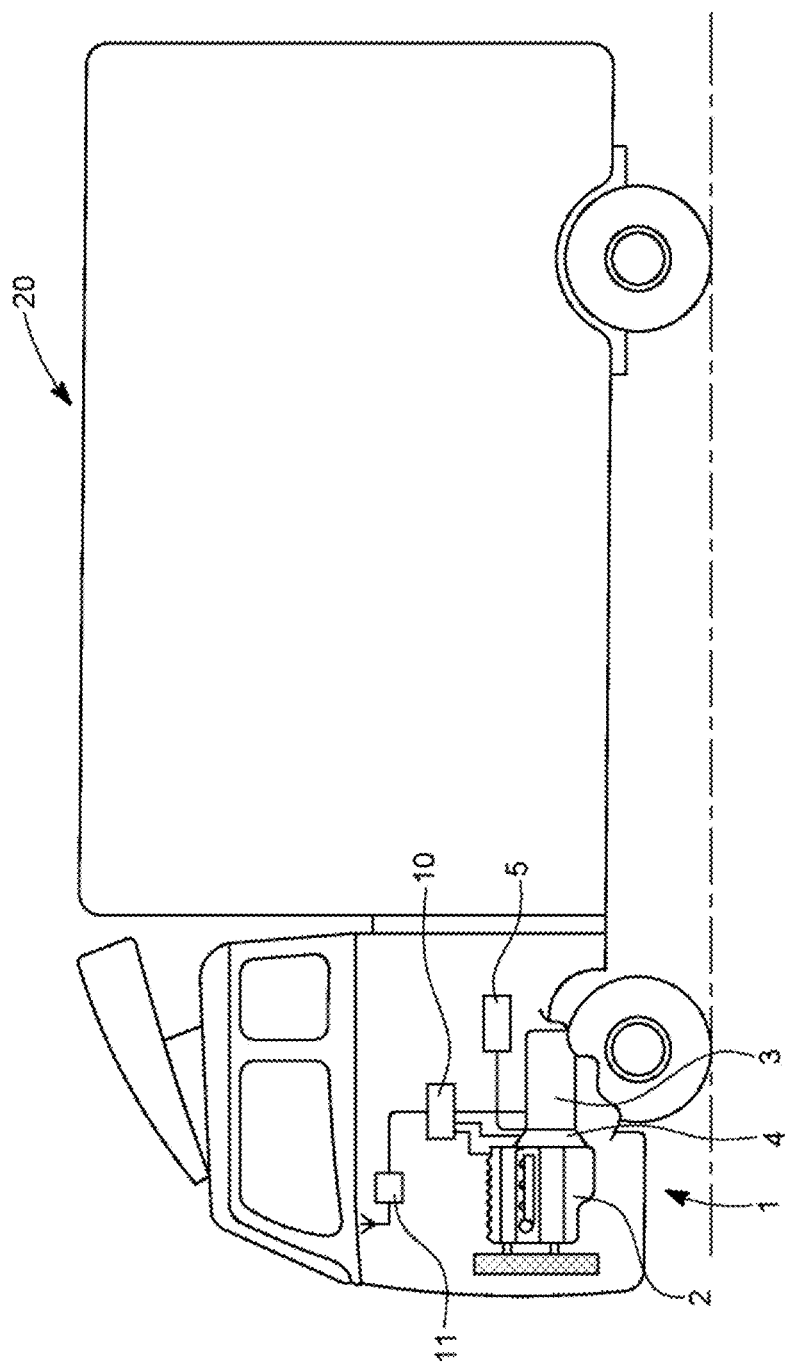
FIG. 1 shows a schematic vehicle provided with a driveline.

FIG. 1 shows a schematic vehicle 20 provided with a driveline 1 and an electronic control unit 10. The driveline comprises in the shown example an internal combustion engine 2 and a transmission 3. In one example, the driveline also comprises an electric machine 4, such that the vehicle can be used in a hybrid mode, where the electric machine is powered by a battery 5. The electric machine may be integrated with the engine/transmission and may be used both for driving the vehicle and for regeneration of brake energy. The electric machine may also be a separate electric machine arranged e.g. at the rear axle of the vehicle. The vehicle could also be an electric vehicle powered by only an electric machine. In this case, the transmission may not be needed.

In this example, the vehicle 20 is a heavy-duty vehicle in the form of a truck, powered by the internal combustion engine 2. However, the teachings of the present disclosure may also be implemented in other types of vehicles powered by an internal combustion engine and/or an electric machine, such as tractor-semitrailer combinations, busses or passenger cars.

The vehicle further comprises an electronic control unit (ECU) 10, which is operatively connected to the driveline 1. The vehicle also comprise a positioning system 11, such as a GPS system. The ECU 10 may, by means of the positioning system 11, acquire topographic data representative of the topography of the complete upcoming route. When the ECU has acquired the topographic data and has determined a number of predictive parameters, such as different road segments, weather, traffic density, etc. that will affect the average speed of the vehicle and the cost of driving the vehicle, a driving mode is selected. The driving mode is selected based on e.g. the predetermined route and the destination, the predetermined arrival time, and the estimated cost for the route.

In a first example, the first driving mode is selected. The first driving mode is an eco-mode that is optimized to minimize the energy consumption to the predetermined destination. In the first driving mode, the ECU 10 controls the driveline to use as little energy as possible for the given distance. In this driving mode, the travel time is not as important, and the vehicle is e.g. allowed to slow down when driving uphill. The vehicle may further be allowed to drive with a lower speed before the vehicle reaches a downhill, where the gravity will speed up the vehicle. The vehicle may also be allowed to drive with a lower average speed, such that e.g. accelerations etc. are minimized. Such measures will save some energy but will at the same time increase the travel time somewhat.

In a second example, the second driving mode is selected. In the second driving mode, the ECU will control the driveline of the vehicle such that the vehicle will arrive at the predetermined destination at a predetermined arrival time or arrival time interval. Further, in the second driving mode, the energy consumption and/or the cost may also be minimized as long as the predetermined arrival time is met. It is e.g. possible to compare the cost of using a toll road to the cost of using a free road, where the free road may require a higher speed and thus a higher fuel cost, to determine the lowest cost for reaching the destination in time.

The second driving mode may be used for the complete route or for parts of the route, depending on the length of the route. In one example, the second driving mode may be used by a driver in order to maximize the travelled distance during a driving shift before a pause break must be made. The ECU will, with the topographic data, determine the distance to different resting areas where a pause can be made and the time and cost to reach those resting areas. If it is determined that a further resting area can be reached by using the second driving mode, the second driving mode may be selected. If it is determined that the further resting area cannot be reached within the allowed remaining driving time, a nearer resting area is selected and the travel time to that resting area is determined. In this case, the first driving mode may be selected, depending on the distance to the resting area.

In one example, the driver starts at a starting point and is allowed to drive for 4.5 hours before a compulsory pause is required. The ECU locates a number of resting areas that are suitable to reach, and calculates the distance to these resting areas and a required average vehicle speed to reach the different resting areas depending on the topographic data. In this example, there are three possible resting areas. The distance to the first resting area is 400 km, the distance to the second resting area is 380 km and the distance to the third resting area is 360 km. The ECU determines that the average speed to reach the first resting area is above 88 km/h, which would not be possible to hold with respect to the topographic nature of the road. To the second resting area, an average speed of 85 km/h would be required, which would be possible to hold if the vehicle is driving in the second driving mode. To the third resting area, an average speed of 80 km/h would be required, which would be possible to hold even in the first driving mode.

The ECU may decide that the second driving mode should be selected such that the driver can take a pause at the second resting area. This decision may be influenced by many parameters. One parameter is the distance from the second resting area to the predetermined destination, i.e. the driving time from the second resting area to the predetermined destination.

Is the remaining driving time less than the allowed driving time, the driver will reach the destination without having to rush and without having a second pause. In one example, the remaining driving time is 3 hours and the allowed driving time is 4.5 hours. In this case, there is no use to rush since the driver will have to take a break anyway at the destination. In this case, the first driving mode can be selected such that the fuel consumption and thus the cost is minimized.

Is the remaining distance to the predetermined destination much longer, such that a night rest is also required in order to reach the destination, the second driving mode may be selected such that the driver can come as far as possible before night rest.

For e.g. a bus driver, the calculation may be different. Bus drivers are often allowed to drive different driving shifts, with longer driving periods and longer resting periods. For a bus driver, wanting to drive as far as possible on a driving shift, it may be of advantage to use the second driving mode the whole time, or it may be of advantage to use a ferry instead of a bridge, even if the cost of the ferry is higher than the cost of using the bridge.

One parameter that also influences the decision is the time of the day, which will in turn influence the traffic density. Depending on this, the estimated average speed will be affected. The traffic density will also be depending on the geographic position of the vehicle. In rural areas, the traffic density is normally less dense than in urban areas. If it is anticipated that the average speed for the next driving shift will be lower, it may be advantageous to select the second driving mode.

The selection of the first driving mode or the second driving mode may be made automatically by the ECU, or may be made by the driver. If the driver has a long drive ahead and a predetermined arrival time, he/she may select the second driving mode at the beginning of the route in order to create a better margin. The driver may e.g. be unsure of the actual traffic situation and thus of the possible average speed that is obtainable. When the driver comes closer to the destination, the predicted arrival time will be easier to estimate.

In another example, the selection between the first driving mode and the second driving mode is made by comparing the cost. In one example, the cost of driving on a toll road at one speed is compared to the cost of driving on a free road with a slightly higher average speed. In this example, the arrival time is the same. By using the toll road, which in this case is slightly shorter and slightly flatter, the first driving mode may be used to reach the destination at the predetermined arrival time. By using the free road, which in this case is slightly longer and hillier, a higher average speed is required and a higher fuel consumption will also be a fact, due to the higher speed and the uphill drives. By comparing the two costs to each other, the most cost efficient route can be selected.

In another example, the predetermined arrival time is a time interval. Here, the cost to arrive inside the time interval can be compared to the penalty fee that may have to be paid for an arrival outside of the time interval. There may e.g. be a fine to be paid for a 30 minutes delay. The cost of this delay fee can be compared to the cost for the vehicle to arrive 30 minutes earlier. It may e.g. be required to use a toll road for the complete route in order to save 30 minutes, and this cost may be higher than the delay fee. In this case, it may be decided to use the first driving mode and to pay the delay fee. It may also be that the cost of using the toll road is lower than the delay fee. In this case, the second driving mode is selected by using the toll road.

In one example, the cost of fuel may also be used for the selection of the driving mode. For e.g. a trip from Munich to Brussels, the shortest route may be over Frankfurt, which in one example would lead to the use of the first driving mode. However, considering the fuel cost in Luxembourg, a somewhat longer route over Luxembourg may be selected if there is a need to fill up the vehicle with fuel. The lower cost of fuel may then be compensated by the higher fuel consumption for the longer route. In another example, a longer route that goes around a mountain may be selected in comparison to a shorter route that goes over the mountain.

If the vehicle is provided with an electric machine such that the vehicle can be used in a hybrid mode, the energy stored in the battery can also be used for the travel time and cost calculations. With a fully charged battery, or a sufficiently charged battery, the additional power that can be supplied by the battery and the electric machine can be used to lower the cost for e.g. going up a hill. If the energy stored in the battery is provided by regenerated brake energy, it can be considered as having no cost. If the energy is provided by charging the battery from the mains, the cost for the charge current is used as the cost.

Figure 2:
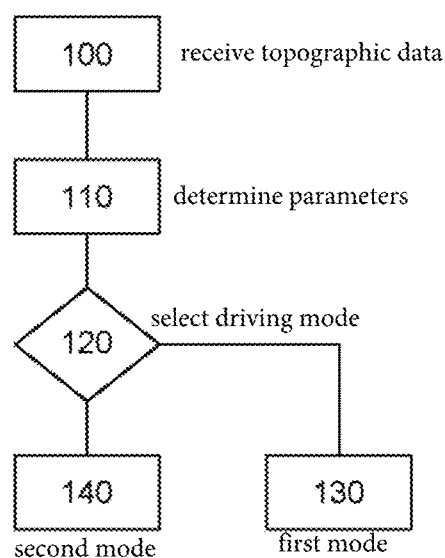
FIG. 2 shows a schematic flow chart of the inventive method.

FIG. 2 shows a schematic flow chart of the method for controlling a driveline of a vehicle. The vehicle comprises a propulsion unit and a transmission, where the method uses topographic data in order to provide predictive control of the vehicle driveline, where the driveline comprises a first driving mode and a second driving mode, and where the vehicle is driving to a predetermined destination.

In step 100, topographic data for the route to the predetermined destination is received by the ECU. The ECU may use a positioning system that receives position data and a map database where the topographic information is stored.

In step 110, a number of predictive parameters for the route are determined. These parameters may include different road segments, weather, traffic density, different points-of-interest, toll roads, etc. The cost for driving different road segments and the travel time for these road segments is calculated and used to determine the selected driving mode.

In step 120, it is determined which driving mode to select. The selection of driving mode may be made automatically by the ECU based on the calculated cost for the different road segments, or the selection of driving mode may be made by the driver.

In step 130, the first driving mode is selected. In this driving mode, the vehicle driveline is controlled in an eco-mode in order to provide the lowest possible energy consumption to the predetermined destination, i.e. for the selected route to the destination.

In step 140, the second driving mode is selected. In this driving mode, the vehicle driveline is controlled in order for the vehicle to arrive at the predetermined destination at a predetermined time.

The ECU may also use the cost for the determination of the driving mode.

The invention is not to be regarded as being limited to the embodiments described above, a number of additional variants and modifications being possible within the scope of the subsequent patent claims.

REFERENCE SIGNS

1: Driveline
2: Internal combustion engine
3: Transmission
4: Electric machine
5: Battery
10: Electronic control unit
11: Positioning system
20: Vehicle

The invention claimed is:

1. A computer-implemented method for controlling a vehicle driveline comprising a propulsion unit and a transmission, where the method uses topographic data in order to provide predictive control of the vehicle driveline, where the vehicle driveline comprises a first driving mode and a second driving mode, where a vehicle is driving to a predetermined destination, comprising the steps of:
   receiving topographic data for a route to the predetermined destination,
   determining a number of predictive parameters for the route,
   where, in the first driving mode, the vehicle driveline is controlled in an eco-mode in order to provide the lowest possible energy consumption to the predetermined destination,
   where, in the second driving mode, the vehicle driveline is controlled in order for the vehicle to arrive at the predetermined destination at a predetermined time, wherein the second driving mode is selected automatically in dependency of a planned route and a predetermined time of arrival.

2. The method according to claim 1, wherein the predetermined time of arrival is an arrival time interval.

3. The method according to claim 1, wherein, in the second driving mode, the energy consumption is optimized to reach the predetermined destination.

4. The method according to claim 1, wherein the second driving mode can be selected manually.

5. The method according to claim 1, wherein the vehicle comprises an electric machine that uses regenerated energy to increase a power of the propulsion unit.

6. A non-transitory computer program product comprising program code stored on a computer readable medium for performing all the steps of claim 1 when said program code is run on a computer.

7. An electronic control unit for controlling a vehicle driveline in a vehicle, the electronic control unit being configured to perform the steps of the method according to claim 1.

8. A vehicle comprising an electronic control unit according to claim 7.

* * * * *